United States Patent
Shimizu et al.

(10) Patent No.: US 8,183,839 B2
(45) Date of Patent: *May 22, 2012

(54) SWITCHING POWER SOURCE SYSTEM

(75) Inventors: Hideo Shimizu, Higashimurayama (JP);
Isao Amano, Hino (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 270 days.

This patent is subject to a terminal disclaimer.

(21) Appl. No.: 12/457,344

(22) Filed: Jun. 8, 2009

(65) Prior Publication Data

US 2009/0303765 A1    Dec. 10, 2009

(30) Foreign Application Priority Data

Jun. 9, 2008    (JP) ................................. 2008-150166

(51) Int. Cl.
*G05F 1/70*    (2006.01)
*G05F 1/613*    (2006.01)

(52) U.S. Cl. ........ 323/207; 323/222; 323/284; 323/285; 363/89

(58) Field of Classification Search .................. 323/222, 323/223, 282, 284, 285, 205, 207; 363/89
See application file for complete search history.

(56) References Cited

U.S. PATENT DOCUMENTS

| | | | |
|---|---|---|---|
| 6,191,564 B1 | 2/2001 | Mao | |
| 7,514,912 B2 * | 4/2009 | Shao et al. | 323/285 |
| 7,843,186 B2 * | 11/2010 | Nishida | 323/284 |
| 7,936,152 B2 * | 5/2011 | Shimizu | 323/222 |

FOREIGN PATENT DOCUMENTS

| | | |
|---|---|---|
| JP | 04-168975 | 6/1992 |
| JP | 2001-178139 | 6/2001 |
| JP | 2007-143383 | 6/2007 |

\* cited by examiner

*Primary Examiner* — Gary L Laxton
(74) *Attorney, Agent, or Firm* — Rabin & Berdo, P.C.

(57) ABSTRACT

An error voltage Verr, being a difference between DC output voltage Vout and output reference voltage Vref, and an input voltage Vin are multiplied to produce first threshold voltage signal Vth1 in phase with and similar to input voltage Vin and proportional to Verr. Second threshold voltage signal Vth2 is produced from first threshold voltage signal Vth1. The input current is detected as a current detection signal Vi across a resistor 12, whether it is between the threshold value signals is detected by a current range detecting circuit, and accordingly, the timing of turning on or off switching device is controlled so that at least one of an duration on and an off duration of the switching device is limited to enhance a power factor. Unfixed off duration disperses a noise spectrum to prevent an increase in switching frequency, to reduce noise.

10 Claims, 11 Drawing Sheets

=== PAGE 1 ===

SWITCHING POWER SOURCE SYSTEM

CROSS-REFERENCE TO RELATED APPLICATION

This application claims the foreign priority benefit under 35 USC §119 of Japanese application ser. No. JP PA 2008-150166, filed Jun. 9, 2008, the entire disclosure of which is incorporated herein by reference.

BACKGROUND OF THE INVENTION

1. Field of the Invention

The present invention relates to a switching power source system with a power factor correcting mode in which a stable DC power source is formed from an AC power source and is operated so that an input voltage and an input current to a chopper circuit are approximately in phase and have similar waveforms.

2. Background Art

Control methods of this kind for switching power source systems include a critical conduction mode control method that carries out control so as to make a switching device turned on when a coil current becomes zero and a continuous conduction mode control method that carries out control so as not to make the coil current become zero. In general, the critical conduction mode control method is advantageous for the purpose of noise reduction, as switching is carried out when the coil current is zero. This method, however, causes current ripples to become large, so that large stresses are imposed on a coil and a diode, so the method is difficult to apply to use with a heavy load.

The continuous conduction mode control method causes larger switching noises compared with the critical conduction mode control method. However, in this method, current ripples are smaller and stresses imposed on the coil and the diode are also smaller, so the method can used with a heavy load. Thus, in general, for a load up to in the order of about 100 watts, the critical conduction mode control method is used and, for a load over about 100 watts, the continuous conduction mode control method is used.

Figure 6:
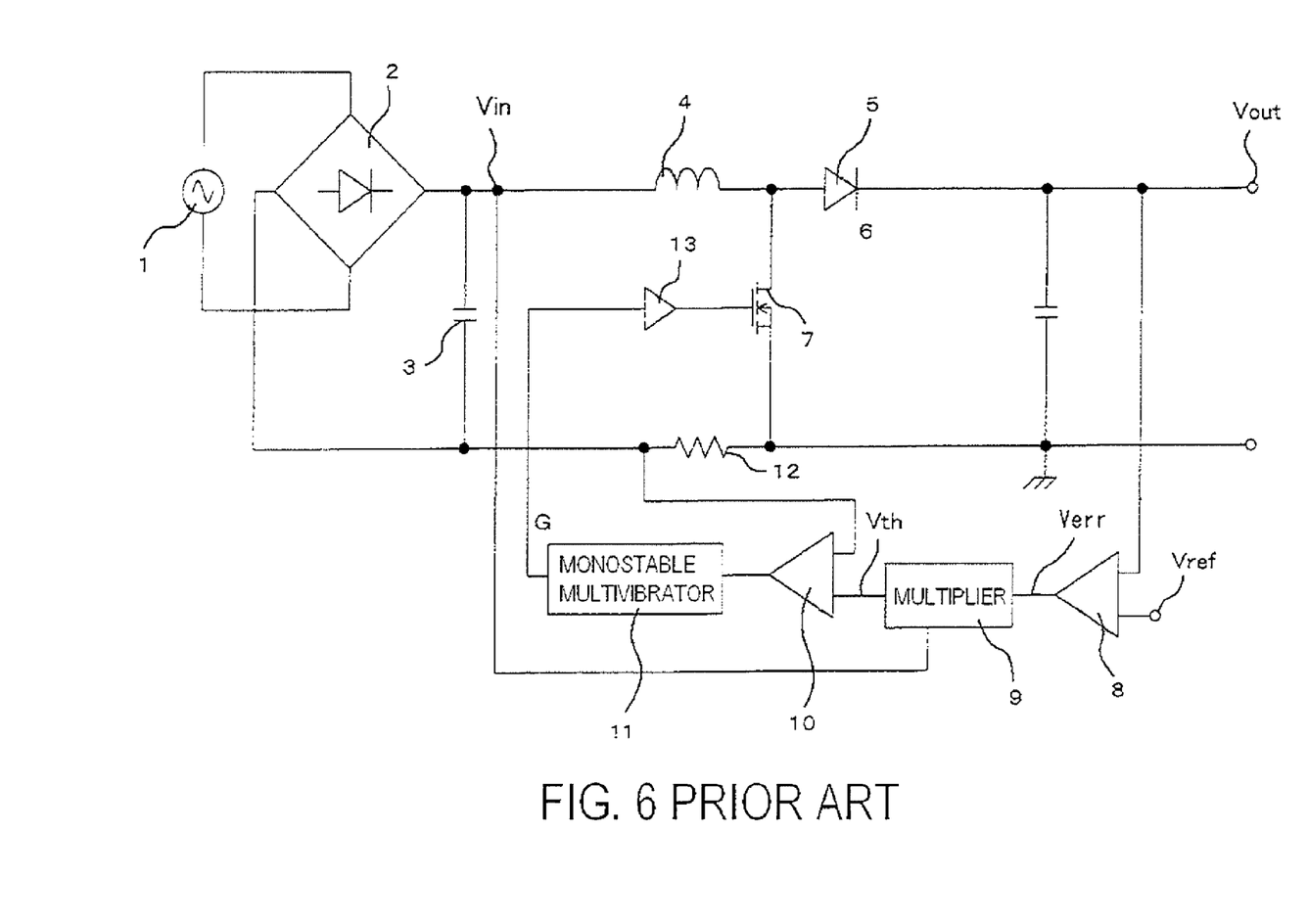
FIG. 6 is a circuit diagram showing a circuit configuration in an example of a related switching power source system.

FIG. 6 is a circuit diagram showing a circuit configuration in an example of a related switching power source system of the continuous conduction mode control method disclosed in, for example, JP-A-04-168975. In FIG. 6, the switching power source system includes an AC power source 1, a rectifier circuit 2, capacitors 3 and 6, an inductor 4, a diode 5, a switching device 7, such as a MOSFET (metal-oxide-semiconductor field-effect transistor), a voltage error amplifier 8, a multiplier 9, a comparator 10, a monostable multivibrator 11, a current detecting resistor 12 and a driving circuit 13.

An AC voltage outputted from the AC power source 1 is full-wave rectified by the rectifier circuit 2, in the form of a diode bridge, high frequency noises being removed from the rectified voltage by the capacitor 3. The rectified voltage is supplied to the capacitor 6 via the inductor 4 and the diode 5 and is thereby smoothed. The smoothed rectified voltage is outputted as a DC output voltage Vout. The switching device 7, which may be a MOSFET, is connected across a point between the inductor 4 and the diode 5 and a point at ground potential to turn a current flowing from the inductor 4 to the diode 5 on and off. The voltage error amplifier 8 amplifies an error voltage between the DC output voltage Vout and an output reference voltage Vref and outputs an amplified error voltage Verr to the multiplier 9. The multiplier 9 multiplies the amplified error voltage Verr and an input voltage Vin together to produce a threshold value signal Vth, which is in phase with and has a similar waveform to the input voltage Vin, and is proportional in amplitude to the error voltage Verr.

A current flowing in the inductor 4 is transformed by the current detecting resistor 12 into a current detection signal Vi across the resistor 12. The current detection signal Vi is compared with the threshold value signal Vth by the comparator 10. The output of the comparator 10 is inputted to the triggering input terminal of the monostable multivibrator 11. The monostable multivibrator 11 keeps its output at a low level for a specified duration after the triggering signal is inputted, and thereafter the monostable multivibrator 11 changes its output voltage to a high level. The output of the multivibrator 11 is inputted to the driving circuit 13, which makes the switching device 7 turned on when the input voltage is at the high level and turned off when the level of the input voltage is at the low level.

In such a configuration, when the switching device 7 is turned on, the current flowing in the inductor 4 is increased and the current detection signal Vi rises. When the current detection signal Vi exceeds the threshold value signal Vth, the output voltage of the comparator 10 becomes a high level, so that a trigger signal is inputted to the monostable multivibrator 11, the output of the monostable multivibrator 11 goes to a low level, and the switching device 7 is turned off via the driving circuit 13. Then, the current from the inductor 4 decreases gradually. As the duration during which the output of the monostable multivibrator 11 is at a low level is set so that the current from the inductor 4 does not become zero, the output of the monostable vibrator 11 is changed to a high level and the switching device 7 turned on via the driving circuit 13.

Figure 7A:
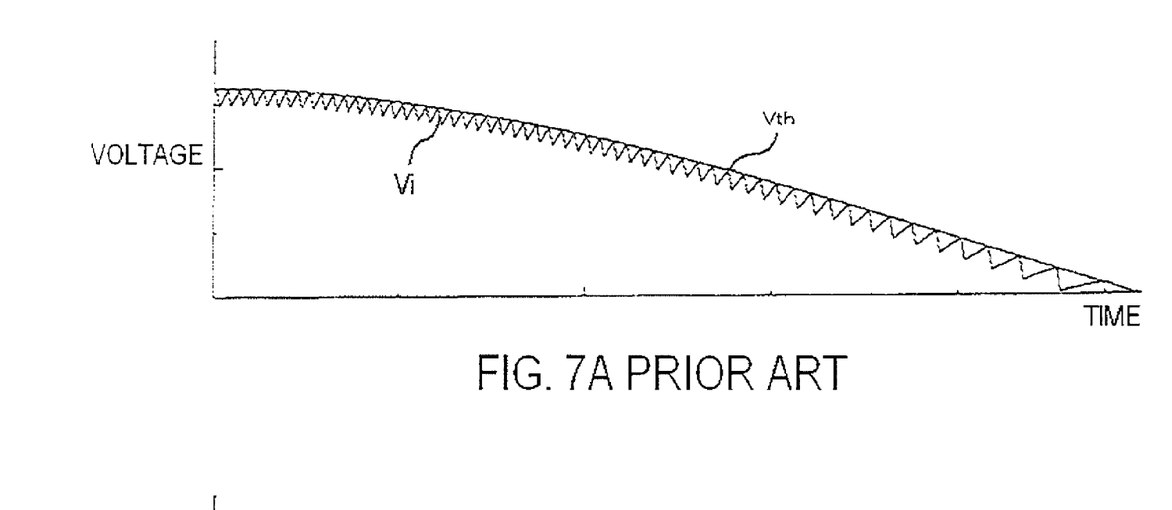
FIG. 7A is a waveform diagram illustrating a relation between a threshold value signal Vth and a current detection signal Vi in the example of the related switching power source system.
Figure 7B:
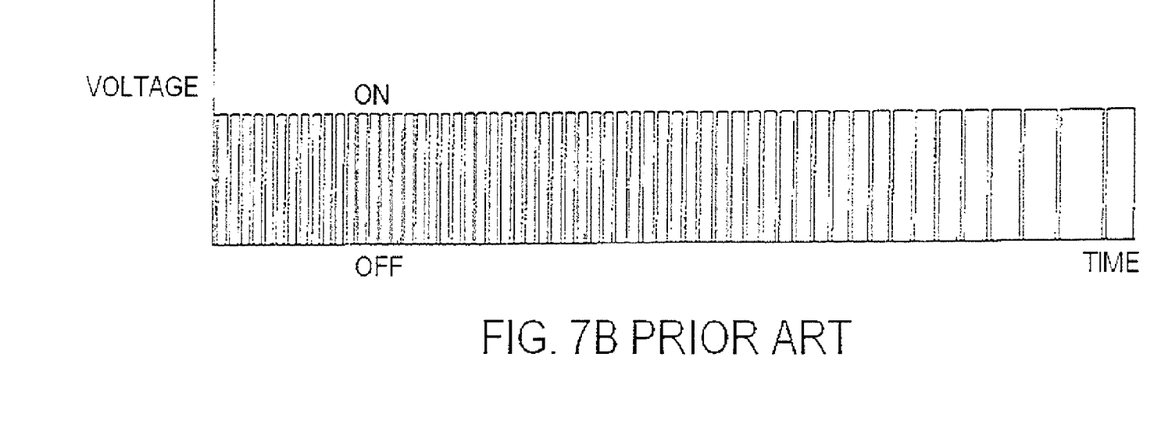
FIG. 7B is a waveform diagram showing the turned-on state and the turned-off state of the switching device in the example of the related switching power source system.

FIGS. 7A and 7B are waveform diagrams illustrating the operation of the above-described example of the related switching power source system. Here, FIG. 7A is a waveform diagram illustrating a relation between the threshold value signal Vth and the current detection signal Vi, and FIG. 7B is a waveform diagram showing the turned on state and the turned off state of the switching device 7. As shown in FIG. 7A, control is carried out so that the peak of a current flowing in the inductor 4 coincides with the threshold value signal Vth, having a waveform in phase with and similar to the waveform of the input voltage Vin. As the duration during which the switching device 7 is made turned on varies and the duration during which the switching device 7 is made turned off is fixed, the frequency of switching the switching device 7 varies as shown in FIG. 7B, so as to also vary the frequencies of generated noise. This causes the spectrum of the noise to disperse to enable noise reduction even using the continuous conduction mode control method.

To improve a power factor of a switching power source system, an input current is required to have a waveform in phase with and similar to that of an input voltage. To achieve that, the duty ratio between the switching device 7 being turned on and off is required to be varied widely from nearly 0% to nearly 100%. The voltage across the inductor 4 differs according to whether the input voltage is for a 100V system or for a 200V system, and further, always varies even during one cycle of the AC input voltage. Thus, the time constant (di/dt) of a current flowing in the inductor 4 also varies widely. Hence, a current value in a certain period varies largely depending on the value, the phase and the state of the load of an input voltage. Therefore, when the period during which the switching device 7 is made turned off is fixed, as in the example of the related switching power source system, an excess or deficiency is caused in the necessary current variation, which becomes a problem in as much as it limits the power factor improvement. Moreover, in the case of the critical conduction mode control method, the switching device 7 is required to be made turned on at a time when the current becomes zero. This makes critical conduction mode control difficult when the period during which the switching device 7 is made turned off is fixed, as in the example of the related switching power source system.

Compared with this, in JP-A-2007-143383, for example, the following power factor improving method is proposed. In this method, a second threshold value signal Vth2 is provided which is proportional to a threshold value signal Vth1, and control is carried out so that a switching device is made turned off when a voltage across a current detecting resistor, produced by a current flowing in an inductor, reaches the threshold value signal Vth1 and the switching device is made turned on when a voltage across the current detecting resistor, produced by a current flowing in the inductor, becomes lower than the second threshold value signal Vth2. According to this method, the period during which the switching device is made turned on and the period during which the switching device is made turned off are not fixed, but the turning on and off of the switching device are carried out with automatically optimized periods on the basis of the state of an input voltage and the state of a load, to enable an improvement in power factor.

Figure 8A:
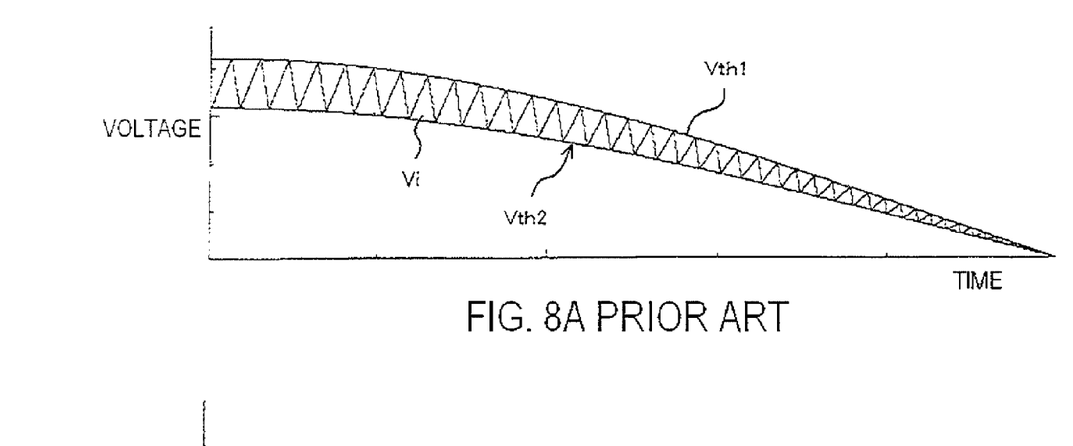
FIG. 8A is a waveform diagram illustrating a relation between a first threshold value signal Vth1, a second threshold value signal Vth2 and a current detection signal Vi in another example of a related switching power source system.
Figure 8B:
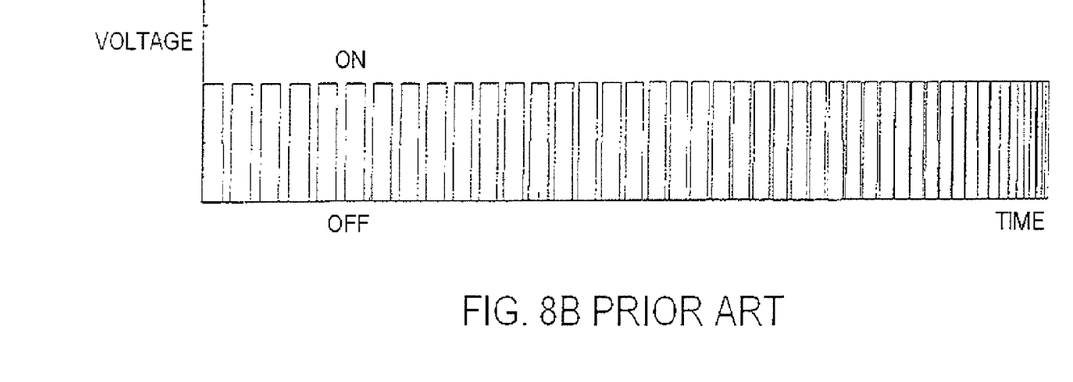
FIG. 8B is a waveform diagram showing the turned-on state and the turned-off state of the switching device in the example of the related switching power source system with the relation between threshold value signals and the current detection signal shown in FIG. 8A.

However, with the second threshold value signal Vth2 determined to have a value in a certain ratio to the value of the first threshold value signal Vth1, as is described in the foregoing, the difference between the first threshold value signal Vth1 and the second threshold value signal Vth2 becomes small, as shown in FIG. 8A, where the averaged value of the current flowing in the inductor is small, as in the case where the input voltage is high and the load is light. This causes the switching frequency to become high, as shown in FIG. 8B, resulting in the problems that noise and switching loss are increased. Moreover, when the averaged value of the current flowing in the inductor is large, as in the case where the input voltage is low and the load is heavy, the difference between the first threshold value signal Vth1 and the second threshold value signal Vth2 becomes large. This causes the switching frequency to become low, leading to the problem of increasing low frequency noise (see also FIGS. 8A and 8B).

Furthermore, each of JP-A-2001-190073 (corresponding to U.S. Pat. No. 6,191,564 B1) and JP-A-2001-178139 also discloses a power factor improving method for a switching power source system. Each of these disclosures, however, relates to an improvement realized by making a current instruction value itself delayed, the method of which is different from the method of the invention.

SUMMARY OF THE INVENTION

Accordingly, in one aspect of the invention a switching frequency is limited to thereby reduce noises and switching losses, so as to enhance the power factor of a switching power source system.

In this first aspect of the invention, a switching power source system is provided with a rectifier circuit carrying out full-wave rectification of the output of an AC power source to obtain a pulsating output, a switching device turning a current flowing in an inductor connected to the rectifier circuit on and off, a chopper circuit including a capacitor smoothing the current supplied from the inductor for obtaining a DC output, a first signal producing circuit producing a first threshold value signal in phase with the input voltage to the chopper circuit with a waveform similar thereto and having an amplitude proportional to an amount of an error voltage of the output voltage of the chopper circuit, a second signal producing circuit producing a second threshold value signal on the basis of the first threshold value signal, a current detecting circuit detecting a current flowing in the inductor, a current range detecting circuit detecting when the value of a current detected by the current detecting circuit becomes an upper limit value or a lower limit value by comparing the value of the current with the value of the first threshold value signal and the value of the second threshold value signal, and a switching control circuit setting the switching device to be turned on or turned off on the basis of the result of the detection of the current range detecting circuit and, along with this, adjusting the timing of at least one of turning on and turning off of the switching device.

In a second aspect of the invention, in the switching power source system according to the first aspect of the invention, the switching control circuit is configured so as to delay the timing of turning on the switching device by a specified time interval. In a third aspect of the invention the switching control circuit limits at least one of an on duration and an off duration. In a fourth aspect of the invention, in any one of the first to third aspects of the invention, the delayed or limited duration can be varied according to a magnitude of an input voltage, an output voltage or an output current.

According to the invention, the turning on and the turning off of the switching device are to be carried out so that a value of a current flowing in the inductor falls between a first threshold value, in phase with and similar to the waveform of the input voltage and having an amplitude proportional to that of the error voltage signal, and a second threshold value proportional to the first threshold value. Thus, the turning on and turning off of the switching device are carried out automatically with optimum durations depending on conditions of an input voltage and conditions of a load without the on duration or the off duration being fixed. This makes it possible to enhance the power factor. In addition, a switching frequency is varied by changing the on duration and off duration to disperse the spectrum of generated noise to provide noise reduction. Furthermore, limiting the switching frequency by limiting the on duration and off duration reduces high frequency noise and switching loss.

DESCRIPTION OF THE PREFERRED EMBODIMENT

Figure 1:
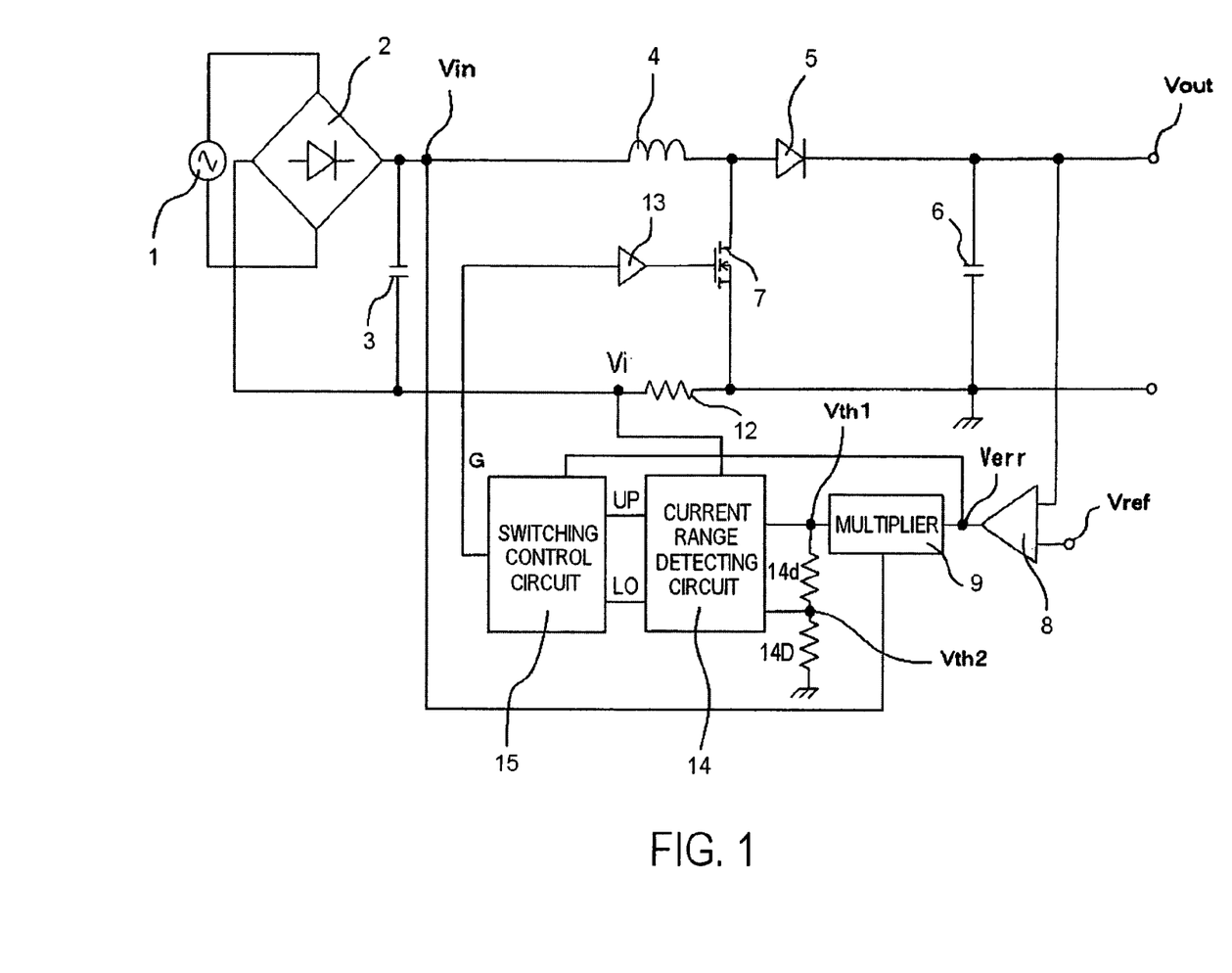
FIG. 1 is a circuit diagram showing the circuit configuration of a switching power source system according to an embodiment of the invention.

FIG. 1 is a circuit diagram showing the circuit configuration of a switching power source system according to an embodiment of the invention. In FIG. 1, the same constituents as those in the example of the related switching power source system shown in FIG. 6 will be denoted with the same reference numerals and signs with explanations thereof omitted.

An AC voltage outputted from an AC power source 1 is subjected to full-wave rectification in a rectifier circuit 2 formed of a diode bridge to be a Rectified voltage, from which high frequency noise is removed by a capacitor 3. The rectified voltage is supplied to a capacitor 6 through an inductor 4 and a diode 5 and is thereby smoothed. The smoothed rectified voltage is outputted as a DC output voltage Vout. A switching device 7, such as a MOSFET, is connected across a point between the inductor 4 and the diode 5 and a point at ground potential to turn a current flowing from the inductor 4 to the diode 5 on and off.

A voltage error amplifier 8 amplifies an error voltage comprising a difference between the DC output voltage Vout and an output reference voltage Vref to output an amplified error voltage Verr to a multiplier 9. The multiplier 9 multiplies the value of the amplified error voltage Verr by the value of an input voltage Vin. The multiplier 9 produces a first threshold value signal Vth1 in phase with and similar in waveform to the input voltage Vin and having an amplitude proportional to that of the error voltage Verr. Moreover, the voltage of the first threshold value signal Vth1 is divided by a resistor 14C and a variable resistor 14D connected in series between the output side of the multiplier 9 and the ground, whose potential is a reference potential, to produce a second threshold value signal Vth2 based on the first threshold value signal Vth1 at the connection point of the resistors 14C and 14D.

A current flowing in the inductor 4 is transformed by a current detecting resistor 12 into the voltage of a current detection signal Vi across the resistor 12. The voltage of the current detection signal Vi is compared with the voltage of the first threshold value signal Vth1 and the voltage of the second threshold value signal Vth2 in a current range detecting circuit 14. When the voltage of the current detection signal Vi is higher than the voltage of the first threshold value signal Vth1, the current range detecting circuit 14 outputs an upper limit signal UP and, when the voltage of the current detection signal Vi is lower than the voltage of the second threshold value signal Vth2, the current range detecting circuit 14 outputs a lower limit signal LO. The upper limit signal UP and the lower limit signal LO outputted from the current range detecting circuit 14 are inputted to a switching control circuit 15, which outputs a gate signal G to a driving circuit 13 on the basis of the upper limit signal UP and the lower limit signal LO. The driving circuit 13 makes the switching device 7 turned on when the level of the gate signal G is at a high level and turned off when the level of the gate signal G is at a low level.

Figure 2:
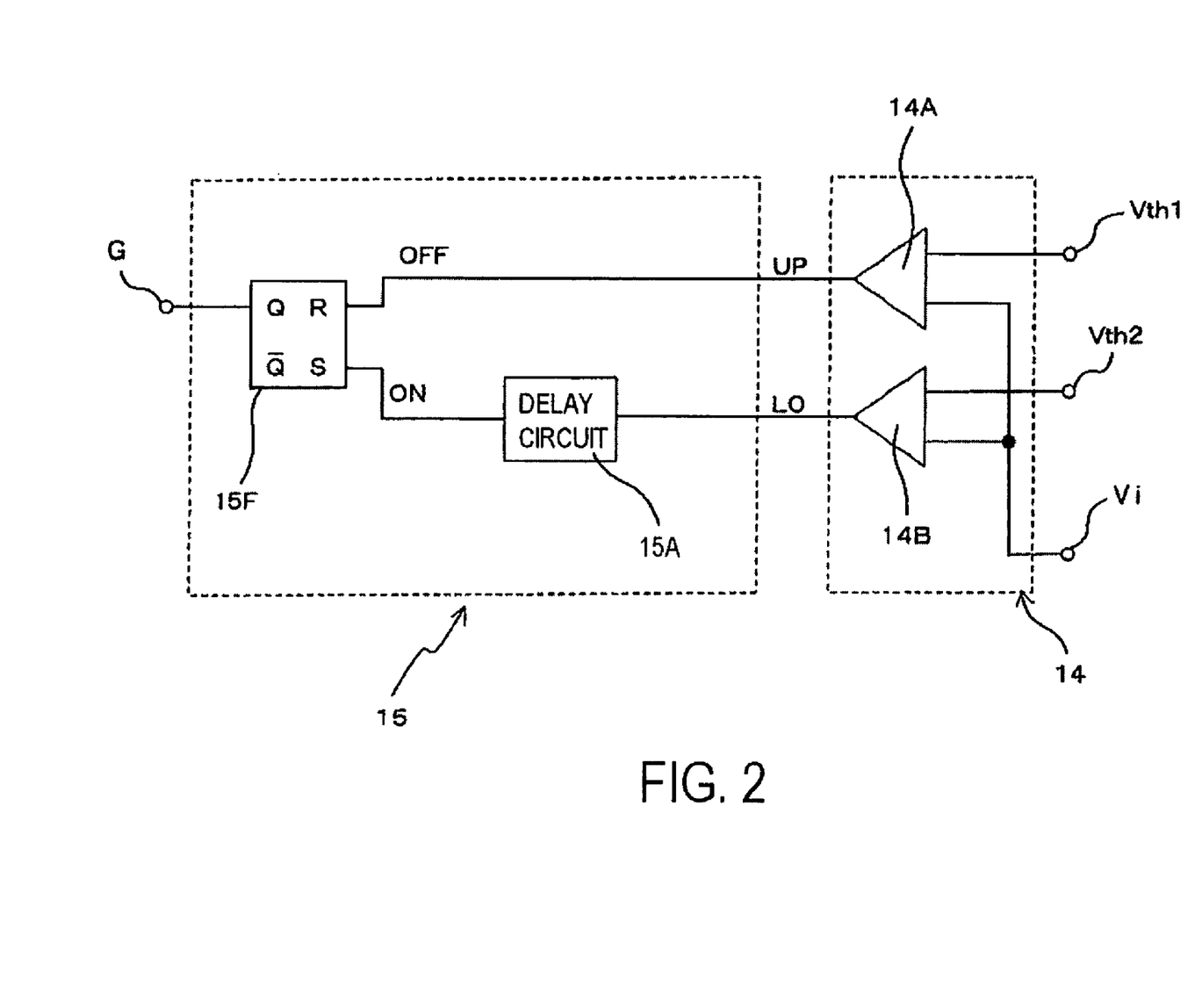
FIG. 2 is a circuit diagram showing the configuration of an example of the switching control circuit used in the switching power source system shown in FIG. 1 together with the configuration of the current range detecting circuit.
Figure 3:
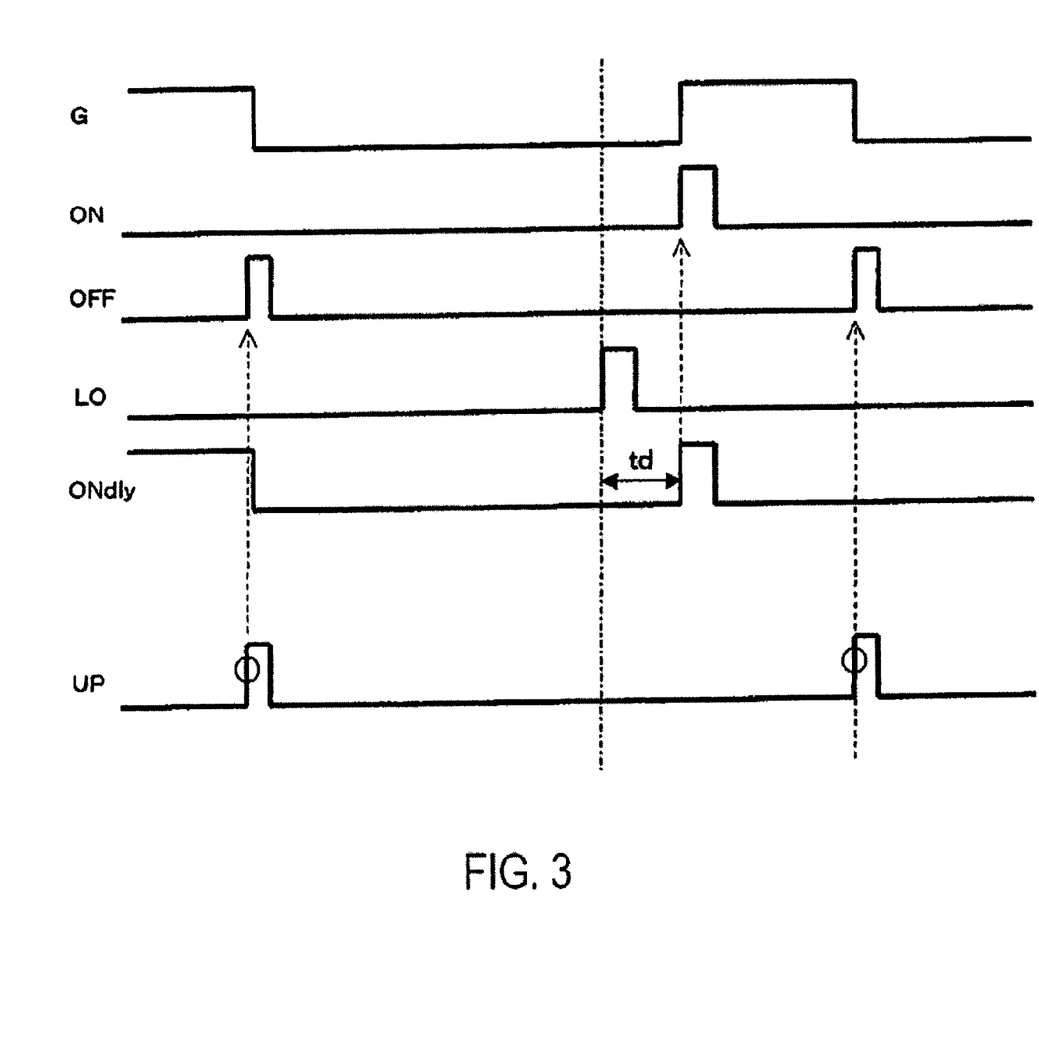
FIG. 3 is a timing chart of signals illustrating the operation of the switching control circuit shown in FIG. 2.

FIG. 2 is a circuit diagram specifically showing the configuration of an example of the switching control circuit 15 used in the switching power source system shown in FIG. 1 together with the configuration of the current range detecting circuit 14 and FIG. 3 is a timing chart of signals illustrating the operation of the switching control circuit 15 shown in FIG. 2.

In the current range detecting circuit 14, the voltage of the current detection signal Vi is compared with the voltage of the first threshold value signal Vth1 by a comparator 14A. When the voltage of the current detection signal Vi is higher than the voltage of the first threshold value signal Vth1, the upper limit signal UP is outputted. Moreover, the voltage of the current detection signal Vi is compared with the voltage of the second threshold value signal Vth2 by a comparator 14B. When the voltage of the current detection signal Vi is lower than the voltage of the second threshold value signal Vth2, the lower limit signal LO is outputted.

The switching control circuit 15 includes a delay circuit 15A and a flip-flop 15F. The lower limit signal LO is delayed by a specified duration td by the delay circuit 15A to be outputted as a set signal ON to the flip-flop 15.

In such a configuration, the turning on of the switching device 7 causes the current from the inductor 4 to increase to raise the voltage of the current detection signal Vi. When the voltage of the current detection signal Vi exceeds the voltage of the first threshold value signal Vth1, the level of the upper limit signal UP of the current range detecting circuit 14 becomes a high level. As a result, the flip-flop 15A is reset, so that the level of the output Q of the flip-flop 15F, i.e. the gate signal G becomes a low level to turn off the switching device 7 via the driving circuit 13. This gradually reduces the current from the inductor 4 to cause the voltage of the current detection signal Vi to fall below the voltage of the second threshold value signal Vth2. The voltage of the current detection signal Vi falling below the voltage of the second threshold value signal Vth2 brings the level of the lower limit signal LO outputted from the current range detecting circuit 14 to a high level, which delays the set signal ON by a certain delay time td to be outputted by the delay circuit 15A. As a result, the flip-flop 15A is set, so that the level of the output Q of the flip-flop 15F, i.e. the gate signal G becomes a high level to turn on the switching device 7 through the driving circuit 13.

In the operation described above, at least one of the timing set for turning-on the switching device 7 and the timing set for turning-off the switching device 7 are adjusted. Specifically, in this embodiment, the timing for turning on the switching device 7 is adjusted so as to be delayed. That is, in this embodiment, with timings set in the current range detecting circuit 14 for the lower limit signal LO and the upper limit signal UP for turning on and turning off, respectively, the switching device 7 kept unchanged, the lower limit signal LO has its timing for turning on delayed in the delay circuit 15A to be outputted as the set signal ON to delay the timing of turning on the switching device 7. This extends the switching period of the switching device 7 so as to prevent an increase in the switching frequency.

Figure 4:
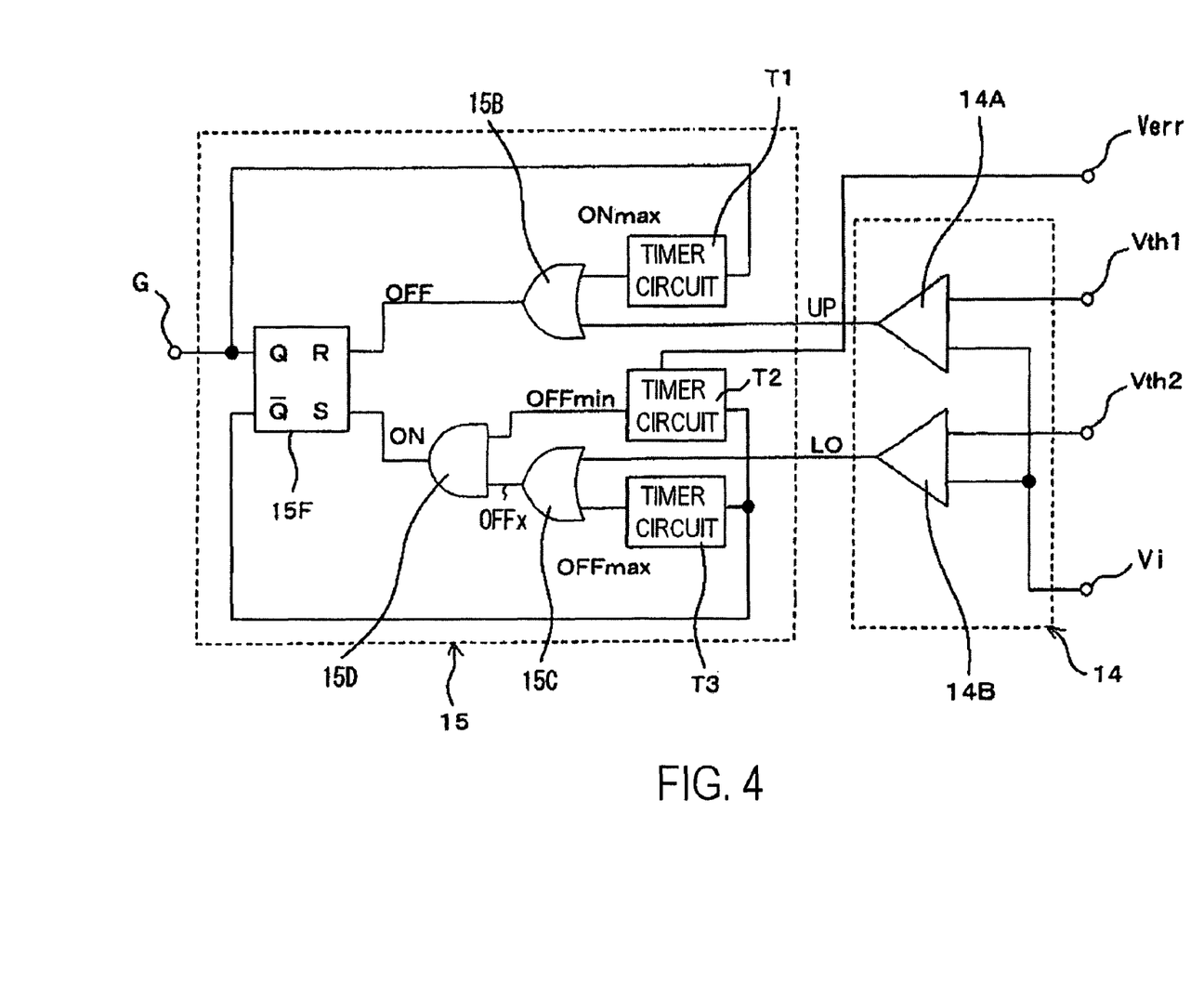
FIG. 4 is a circuit diagram showing the configuration of another example of the switching control circuit.

FIG. 4 is a circuit diagram showing another specific example of the switching control circuit 15 and FIGS. 5A to 5D are timing charts of signals showing the operation of the switching control circuit 15 shown in FIG. 4. In FIG. 4, the current range detecting circuit 14 is the same as that explained in the foregoing. Thus, the explanation thereof will be omitted.

As shown in FIG. 4, the switching control circuit 15 includes timer circuits T1 to T3, logic circuits 15B to 15D (OR circuits 15B and 15C and an AND circuit 15D) and a flip-flop 15F. An upper limit signal UP and a maximum on duration limiting signal ONmax. that is outputted from the timer circuit T1, the level of which signal becomes a high level after a certain time elapsed from the rising of the gate signal G, are inputted to the OR circuit 15B. The OR circuit 15B outputs an OFF signal as a logical sum of these signals to the R terminal of the flip-flop 15F. The level of the OFF signal as a logical sum signal becomes a high level with a timing of one of the upper limit signal UP and the maximum on duration limiting signal Onmax, the level of which one becomes a high level earlier than the other.

A lower limit signal LO and a maximum off duration limiting signal OFFmax that is outputted from the timer circuit T3 the level of which signal becomes a high level after a certain time elapsed from the rising of the gate signal G, are inputted to the OR circuit 15C. The OR circuit 15C outputs an OFFx signal as a logical sum of these signals to the AND circuit 15D. The level of the OFFx signal as a logical sum signal becomes a high level with a timing of one of the lower limit signal LO and the maximum off duration limiting signal OFFmax the level of which one becomes a high level earlier than the other.

The logical sum signal OFFx and a minimum off duration limiting signal OFFmin that is outputted from the timer circuit T2 the level of which signal becomes a high level after a certain time elapsed from the falling of the gate signal G, are inputted to the AND circuit 15D. The AND circuit 15D outputs an ON signal as a logical product of those signals to the S terminal of the flip-flop 15F. The level of the ON signal as a logical product signal becomes a high level with a timing of one of the logical sum signal OFFX and the minimum off duration limiting signal OFFmin the level of which one becomes a high level later than the other.

Figure 5A:
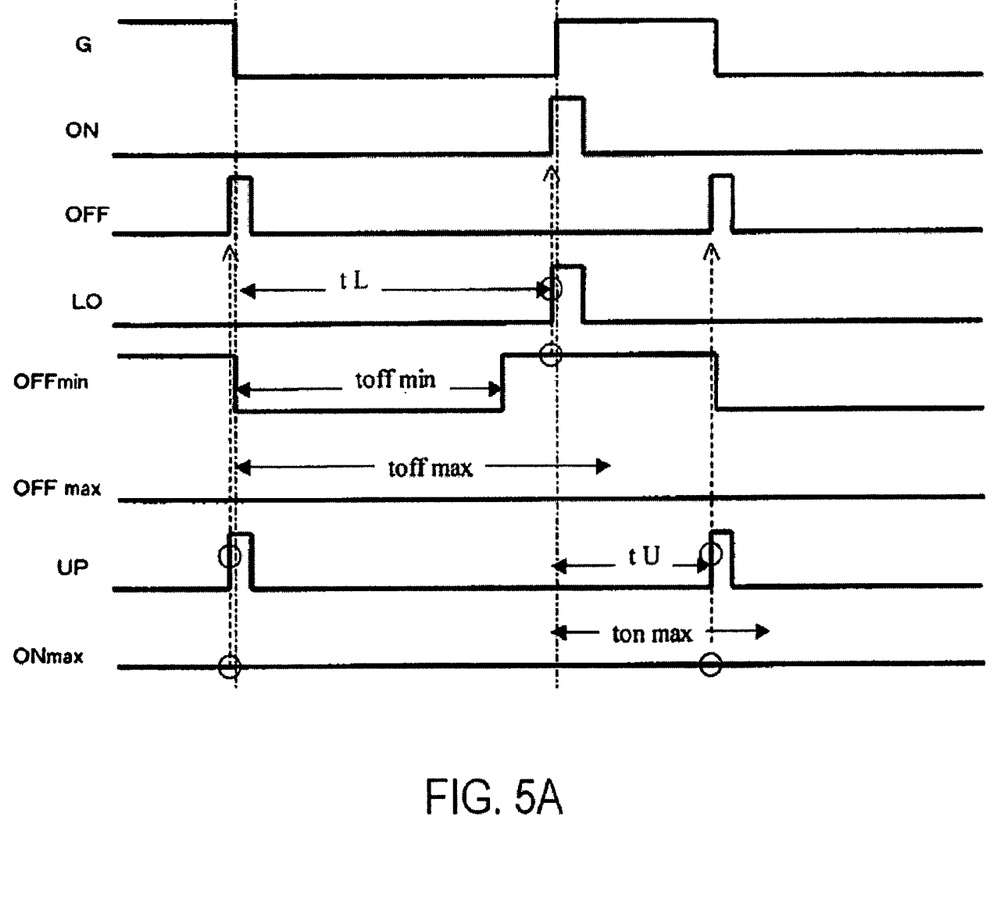
FIG. 5A is a timing chart of signals illustrating an ordinary operating state of the switching control circuit shown in FIG. 4.

FIG. 5A is a timing chart of signals illustrating an ordinary operating state of the switching control circuit 15 shown in FIG. 4. In the ordinary case, a duration tU, elapsed from the turning-on of the switching device 7 due to the rising of the gate signal G to the output of the upper limit signal UP at a high level as the result that the increasing voltage of a current detection signal Vi exceeds the first threshold value signal Vth1, is shorter than a predetermined maximum on duration tonmax of the maximum on duration limiting signal ONmax. Therefore, the time at which the level of the upper limit signal UP becomes a high level is earlier than the time at which the level of the maximum on duration limiting signal ONmax becomes a high level. This makes a reset signal OFF, the level of which becomes a high level with a timing equal to the timing of the upper limit signal UP, outputted from the OR circuit 15B, so that the flip-flop 15F is made reset. Namely, the flip-flop 15F is made reset by the upper limit signal UP, which results in falling of the gate signal G as the output of the flip-flop 15F to a low level to turn-off the switching device 7.

A duration tL, elapsed from the turning off of the switching device 7 due to the falling of the gate signal G to the output of the lower limit signal LO at a high level as the result that the decreasing voltage of the current detection signal Vi falls below the second threshold value signal Vth2, is shorter than a predetermined maximum off duration toffmax of the maximum off duration limiting signal OFFmax in the ordinary case. Therefore, the time at which the level of the lower limit signal LO becomes a high level is earlier than the time at which the level of the maximum off duration limiting signal OFFmax becomes a high level. This makes a signal OFFx (not shown), the level of which becomes a high level with a timing equal to the timing of the lower limit signal LO, be outputted from the OR circuit 15C. The duration tL is longer than a predetermined minimum off duration toffmin of the minimum off duration limiting signal OFFmin. Therefore, the time at which the level of the lower limit signal LO, consequently the level of the signal OFFX, becomes a high level is later than the time at which the level of the minimum off duration limiting signal OFFmin becomes a high level. This makes a reset signal ON, the level of which becomes a high level with a timing equal to the timing of the lower limit signal LO, be outputted from the AND circuit 15D, so that the flip-flop 15F is made set. The flip-flop 15F is made set by the lower limit signal LO, which results in rising of the gate signal G as the output of the flip-flop 15F to a high level to turn on the switching device 7.

Figure 5B:
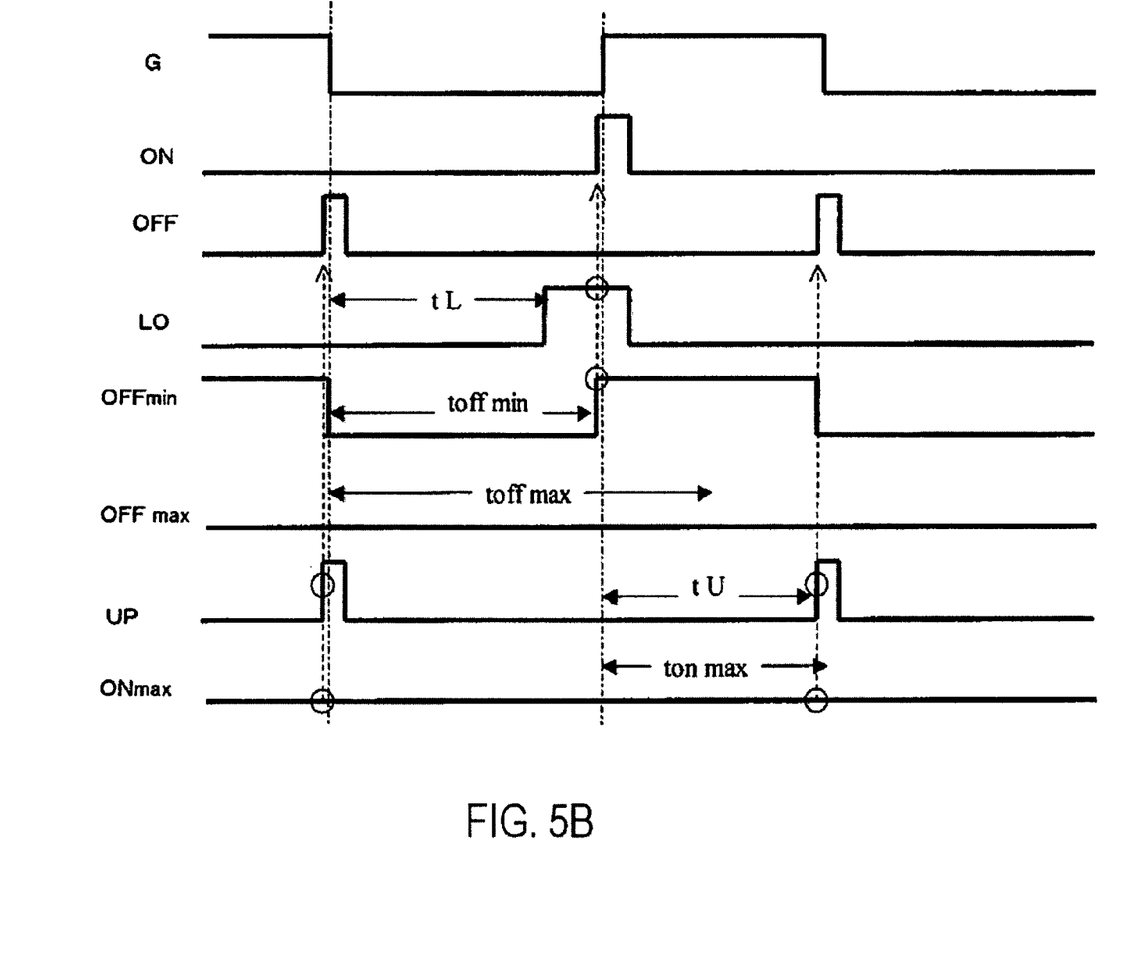
FIG. 5B is a timing chart of signals illustrating an operating state of the switching control circuit shown in FIG. 4 in the case when the switching frequency has a tendency to become higher.

FIG. 5B is a timing chart of signals illustrating an operating state of the switching control circuit 15 shown in FIG. 4 in the case when the duration tL, elapsed from the turning off of the switching device 7 due to the falling of the gate signal G to the output of the lower limit signal LO at a high level, becomes shorter than that in the case shown in FIG. 5A to cause the switching frequency to have a tendency to become higher.

In this case, the duration tL in the lower limit signal LO is shorter than a predetermined maximum off duration toffmax of the maximum off duration limiting signal OFFmax. Therefore, the level of a signal OFFx (not shown) outputted from the OR circuit 15C becomes a high level with a timing equal to that of the lower limit signal LO. The predetermined minimum off duration toffmin of the minimum off duration limiting signal OFFmin is longer than the duration tL. Thus, the level of a set signal ON outputted from the AND circuit 15D becomes a high level with a timing equal to that of the minimum off duration limiting signal OFFmin and the flip-flop 15F is made set by the set signal ON. The flip-flop 15F is made set by the minimum off duration limiting signal OFFmin, which results in rising of the gate signal G as the output of the flip-flop 15F to a high level to turn-on the switching device 7.

Figure 5C:
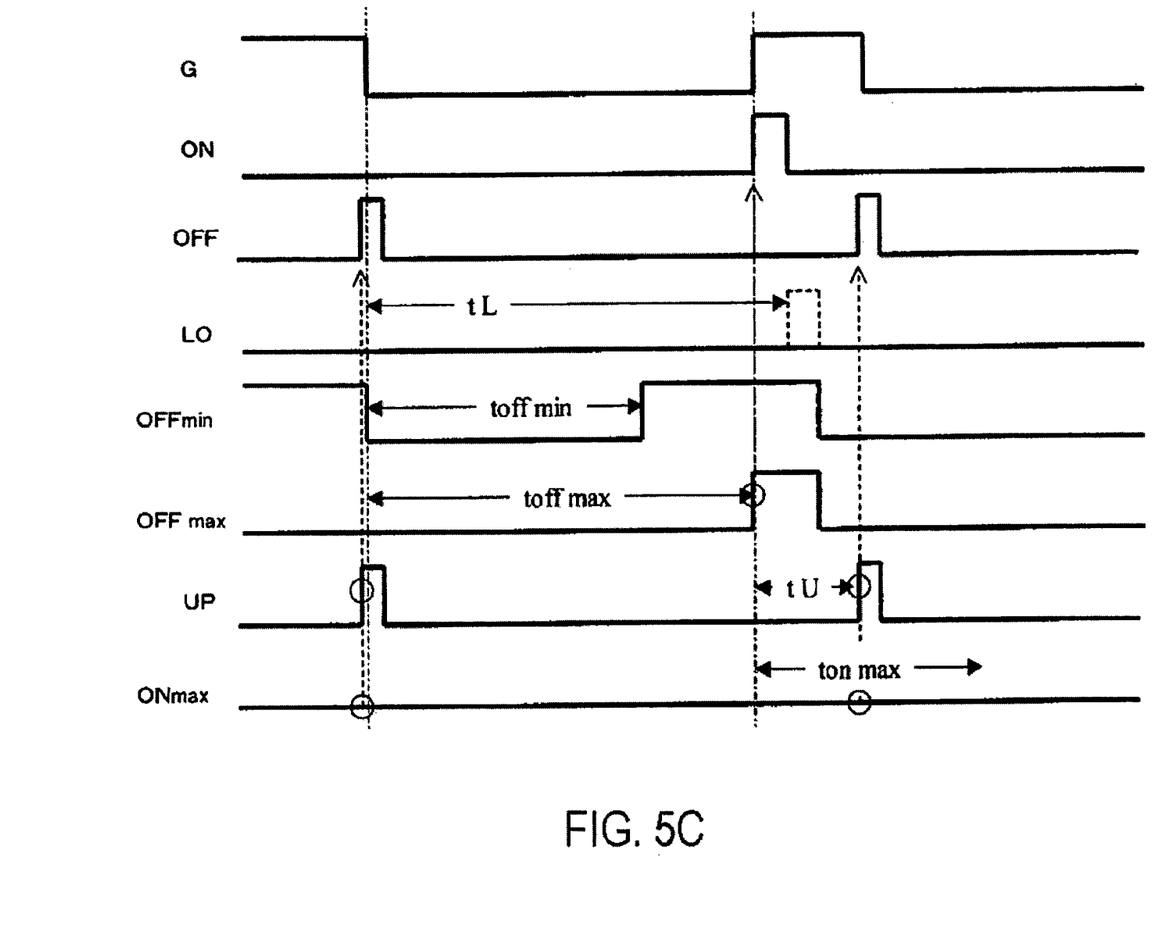
FIG. 5C is a timing chart of signals illustrating an operating state of the switching control circuit shown in FIG. 4 in the case when the switching frequency has a tendency to become lower.

FIG. 5C is a timing chart of signals illustrating an operating state of the switching control circuit 15 shown in FIG. 4 in the case when the duration tL, elapsed from the turning-off of the switching device 7 due to the falling of the gate signal G to the output of the lower limit signal LO at a high level, becomes longer than that in the cases shown in FIGS. 5A and 5B to cause the switching frequency to have a tendency to become lower.

In this case, the duration tL in the lower limit signal LO is longer than a predetermined maximum off duration toffmax of the maximum off duration limiting signal OFFmax. Therefore, the level of a signal OFFX (not shown) outputted from the OR circuit 15C becomes a high level with a timing equal to that of the maximum off duration limiting signal OFFmax. The predetermined maximum off duration toffmax of the maximum off duration limiting signal OFFmax is longer than that of the predetermined minimum off duration toffmin of the minimum off duration limiting signal OFFmin. Thus, the level of a set signal ON outputted from the AND circuit 15D becomes a high level with a timing equal to that of the maximum off duration limiting signal OFFmax and the flip-flop 15F is made set by the set signal ON. The flip-flop 15F is made set by the maximum off duration limiting signal OFFmax, which results in rising of the gate signal G as the output of the flip-flop 15F to a high level to turn-on the switching device 7.

Figure 5D:
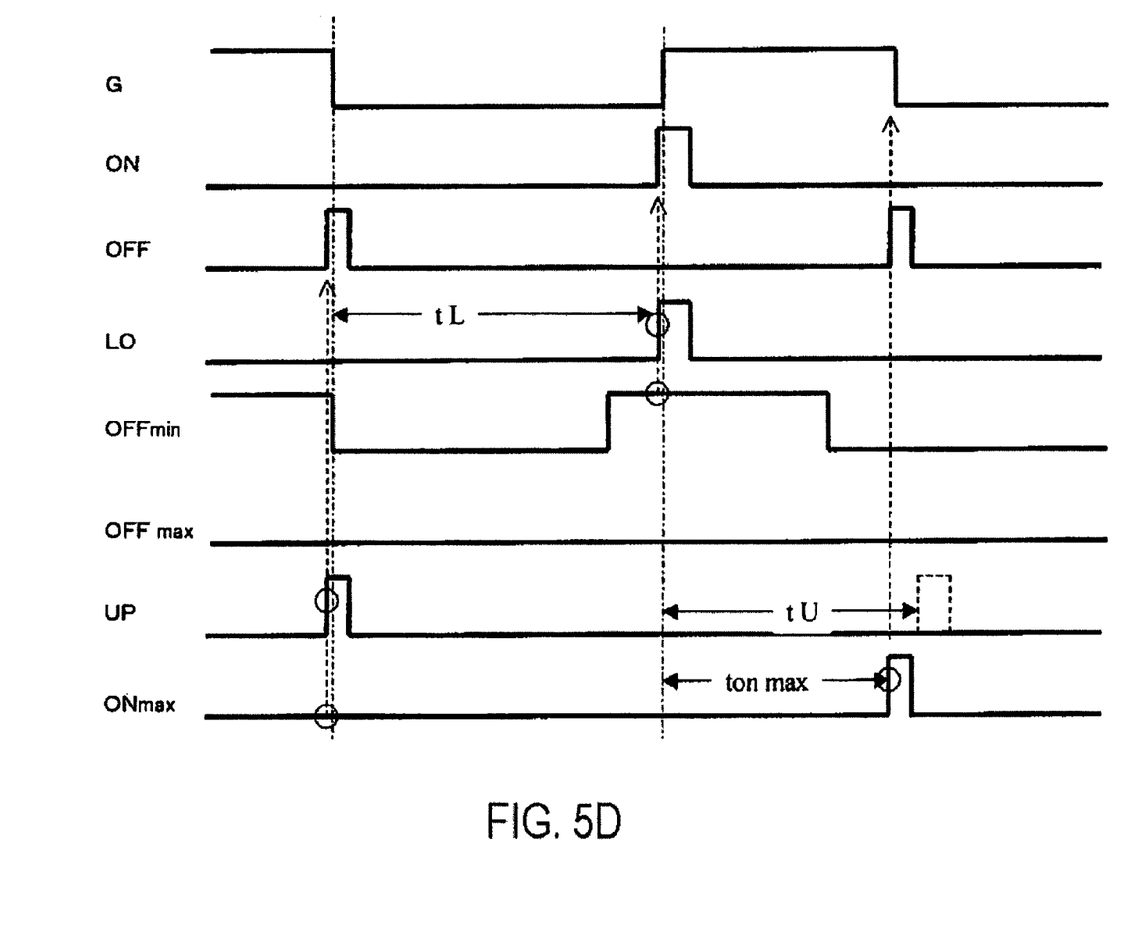
FIG. 5D is a timing chart of signals illustrating an operating state of the switching control circuit shown in FIG. 4 in another case when the switching frequency has a tendency to become lower.

Moreover, FIG. 5D is a timing chart of signals illustrating an operating state of the switching control circuit 15 shown in FIG. 4 when the duration tU, elapsed from the turning-on of the switching device 7 due to the rising of the gate signal G to the output of the upper limit signal UP at a high level, becomes longer than that in the case shown in FIG. 5A to cause the switching frequency to have a tendency to become lower.

In this case, the duration tU in the upper limit signal UP is longer than a predetermined maximum on duration tonmax of the maximum on duration limiting signal ONmax. Thus, the level of a reset signal OFF outputted from the OR circuit 15B becomes a high level with a timing equal to that of the maximum on duration limiting signal ONmax and the flip-flop 15F is made reset by the reset signal OFF. Namely, the flip-flop 15F is made reset by the maximum on duration limiting signal ONmax, which results in falling of the gate signal G as the output of the flip-flop 15F to a low level to turn-off the switching device 7.

Here, a minimum off duration of the minimum off duration limiting signal OFFmin outputted from the timer T2 is varied depending on the value of the error voltage Verr such that the minimum off duration is shortened when an output voltage decreases and is lengthened when the output voltage increases. This makes it possible to limit the range of a switching frequency while keeping an output voltage of a switching power source system at a desired value.

In the operations as described in the foregoing, the times of making the switching device turned on and turned off are adjusted to adjust the resulting on duration and off duration of the switching device. By adjusting the on duration and off duration of the switching device, a switching frequency can be limited within a certain range.

In the foregoing, an example was explained in which both of the on duration and the off duration were limited. However, the switching frequency can be limited by limiting the on duration only or the off duration only.

In the switching control circuit 15 shown in FIG. 4, an on duration can be limited on the basis of the timing of outputting the maximum on duration limiting signal Onmax, by providing at least the timer circuit T1, the OR circuit 15B and the flip-flop 15F.

Similarly, in the switching control circuit 15 shown in FIG. 4, an off duration can be limited on the basis of the timing of outputting the minimum off duration limiting signal OFFmin, by providing at least the timer circuit T2 and the flip-flop 15F.

In the same way, in the switching control circuit 15 shown in FIG. 4, an off duration can be limited on the basis of the timing of outputting the maximum off duration limiting signal OFFmax, by providing at least the timer circuit T3, the OR circuit 15C and the flip-flop 15F.

Here, a configuration in which the AND circuit is provided so that a signal ON, a logical product of the minimum off duration limiting signal OFFmin and the signal OFFx as a logical sum signal, is obtained to be outputted to the S terminal of the flip-flop 15F, can limit the maximum and minimum of the off duration.

In the above embodiment, explanations were made about examples in each of which limited durations are varied on the basis of the output voltage error Verr. The limited durations, however, can be varied by the peak value of the current flowing in the inductor, the peak value of the first threshold value signal Vth1 as an instruction value of the peak value of the current, or an input voltage.

While the present invention has been particularly shown and described with reference to the preferred embodiments thereof, it will be understood by those skilled in the art that the foregoing and other changes in form and details can be made therein without departing from the spirit and scope of the present invention.

What is claimed is:

1. A switching power source system, comprising:
a rectifier circuit configured to carry out full-wave rectification of an AC power source to obtain a pulsating output;
a switching device configured to turn a current flowing in an inductor connected to the rectifier circuit on and off;
a capacitor configured to smooth the current to obtain a DC output;
a first signal producing circuit producing a first threshold value signal in phase with an input voltage, with a waveform similar thereto and having an amplitude proportional to an amount of an error voltage in an output voltage of the DC output;
a second signal producing circuit producing a second threshold value signal based on the first threshold value signal;
a current range detecting circuit configured to detect whether the current becomes an upper limit value or a lower limit value by comparing the current with the first threshold value signal and the second threshold value signal; and
a switching control circuit configured to set the switching device to be turned on or turned off according to a result of the current range detecting circuit and to adjust a timing of at least one of turning on and turning off of the switching device.

2. The switching power source system according to claim 1, wherein the switching control circuit is configured to delay the timing of turning on the switching device by a specified time interval.

3. The switching power source system according to claim 1, wherein the switching control circuit is configured to limit at least one of an on duration and an off duration of the switching device.

4. The switching power source system according to claim 3, wherein the switching control circuit is configured to vary the at least one of the on duration and the off duration according to a magnitude of the input voltage, the output voltage or an output current.

5. The switching power source system according to claim 1, further comprising a current detecting resistor configured to detect the current.

6. A method for switching a switching device, comprising the steps of:
full-wave rectifying an AC power source in a rectifier circuit to obtain a pulsating output;
turning a current flowing in an inductor connected to the rectifier circuit on and off;
smoothing the current to obtain a DC output;
producing a first threshold value signal in phase with an input voltage, having a waveform similar thereto and having an amplitude proportional to an error in the DC output;
producing a second threshold value signal based on the first threshold value signal;

detecting whether the current becomes an upper limit value or a lower limit value by comparing the current with the first threshold value signal and the second threshold value signal; and setting the switching device to be turned on or turned off and adjusting a timing of at least one of turning on and turning off the switching device according to a result of the step of detecting whether the current becomes an upper limit value or a lower limit value.

7. The method according to claim 6, further comprising the step of delaying the timing of turning on the switching device by a specified time interval.

8. The method according to claim 6, further comprising the step of limiting at least one of an on duration and an off duration of the switching device.

9. The method according to claim 8, further comprising the step of varying the at least one of the on duration and the off duration according to a magnitude of the input voltage, an output voltage or an output current.

10. The switching power source system according to claim 6, further comprising the step of detecting the current by measuring a voltage across a current detecting resistor.

* * * * *